(12) United States Patent
Horsch (10) Patent No.: US 7,854,206 B2
(45) Date of Patent: Dec. 21, 2010

(54) SEED METER

(75) Inventor: Thomas Horsch, Schwandorf (DE)

(73) Assignee: Horsch Maschinen GmbH, Schwandorf (DE)

( * ) Notice: Subject to any disclaimer, the term of this patent is extended or adjusted under 35 U.S.C. 154(b) by 0 days.

(21) Appl. No.: 12/567,985

(22) Filed: Sep. 28, 2009

(65) Prior Publication Data

US 2010/0077948 A1   Apr. 1, 2010

(30) Foreign Application Priority Data

Sep. 26, 2008   (DE) ........................ 10 2008 037 397

(51) Int. Cl.
*A01C 7/00* (2006.01)
*A01C 9/00* (2006.01)

(52) U.S. Cl. ..................................... 111/185

(58) Field of Classification Search ................ 111/170, 111/174–185, 14; 222/211, 278
See application file for complete search history.

(56) References Cited

U.S. PATENT DOCUMENTS

| 3,796,346 | A | * | 3/1974 | Ribouleau | 221/211 |
|---|---|---|---|---|---|
| 3,888,387 | A | | 6/1975 | Deckler | 221/278 |
| 4,533,066 | A | * | 8/1985 | Holmes et al. | 221/211 |
| 4,896,616 | A | * | 1/1990 | Wintersteiger et al. | 111/185 |
| 5,392,707 | A | * | 2/1995 | Romans | 111/185 |
| 6,176,393 | B1 | | 1/2001 | Luxon | 221/211 |
| 6,634,522 | B2 | | 10/2003 | Hak | 221/265 |
| 6,718,892 | B1 | * | 4/2004 | Rosenboom | 111/185 |
| 2003/0177969 | A1 | * | 9/2003 | Crabb et al. | 111/185 |
| 2005/0150442 | A1 | * | 7/2005 | Friesen | 111/185 |
| 2005/0204972 | A1 | * | 9/2005 | Eben et al. | 111/185 |

FOREIGN PATENT DOCUMENTS

| DE | 410440 | 3/1925 |
|---|---|---|
| DE | 3400121 | 7/1985 |

\* cited by examiner

*Primary Examiner*—Christopher J. Novosad
(74) *Attorney, Agent, or Firm*—Andrew Wilford (57) ABSTRACT

A seed meter has a housing forming a seed-holding supply chamber and an outlet chamber and a thin feed wheel rotatable in the housing about an axis and formed centered on the axis with an annular array of radially outwardly open and axially throughgoing seats each dimensioned to hold a respective seed. Structure in the housing is positioned to prevent seeds from moving radially outward from the respective seats in the supply chamber but not in the outlet chamber. A pressure differential is applied across the wheel to move seeds in the supply chamber into the seats so that the seeds are expelled from the seats in the outlet chamber. The seeds are fed, one at a time into a seed conduit and/or to a conveyor for transfer to the seed conduit or to the down pipes of the seed coulters.

14 Claims, 11 Drawing Sheets

SEED METER

FIELD OF THE INVENTION

The present invention relates to a seed meter. More particularly this invention concerns a seed meter for separating seeds and dispensing them one at a time.

BACKGROUND OF THE INVENTION

A seed meter typically has a housing forming a seed-holding supply chamber and an outlet chamber and a feed wheel rotatable in the housing and formed seed seats. A pressure differential is applied across the disk to move seeds in the supply chamber into the seats, from which they are expelled one by one in the outlet chamber. Such a seed meter is usually used as an agricultural seeder for working a fields and for a uniform dispensing of seeds.

Seed meters particularly serve for separating and dispensing seeds and for inserting the previously mechanically separated seeds at a precise position at predetermined spacings inside rows of a field. Seed meters must separate single seeds safely and carefully from a seed supply and dispense then from the separating device at a chronological and length spacing that is as accurate as possible.

The separating may be carried out, for example, mechanically by so-called star feeders, and/or by pneumatic support or in many other ways. All currently used seed meters are based on the fact that individual seeds are separated from the seed supply and dispensed toward the ground at an even spacing, depending on the driving speed. The seed separation is carried out by setting the single seeds in respective large seats or cells during the processing of the seed supply, and subsequently discharging them one at a time. The seats are bores or grooves formed on on a cell carrier at regular intervals. In mechanical devices the seeds are inserted into the cells by gravity, partially with or against the support of centrifugal force. In pneumatic devices pressure changes effect the separation. Cell supports may be cell wheels or a perforated tape. Ejection from the cell is carried out freely by gravity and/or centrifugal force, partially supported by scrapers.

Most wheel-guided pneumatic cell systems have the peculiarity that the seed briefly moves perpendicular to a main movement direction during dispensing in order to separate itself from the cell, which may cause dispensing inaccuracies in the direction and at time intervals. Seeds are separated from a cell by rotation and released, which in turn causes slight inaccuracies in the tangential separating direction, particularly in the case of smaller perforated wheels. In mechanical systems the cell holes are relatively large in comparison to single seeds, in pneumatic systems the cell holes are smaller than the seed diameter, and are mostly formed holes. There are also dosing devices having guide slots (see U.S. Pat. No. 4,896,616)) where the cells, however, do not open themselves up into the free space.

Due to ever rising drive speeds there is also an increased need for seed output and accuracy of seed dispensing. In order to achieve this, the seed intake and separation must be accelerated in the separators, and the output thereof must be enlarged. The problem may be solved, for example, by a quicker seed intake via an air stream that is as large as possible, or an air stream of large cross-section, while keeping the seed dispensing even.

Above-cited U.S. Pat. No. 4,896,616 discloses a single-seed meter is having a driven seed wheel forming the rear wall of a seed container, connected to a suction blower, and having suction seats for the seeds so as to dispense the suctioned seeds along a path leading from the base area of the container toward the top from the seed area through a container opening from the seed container. The seeding wheel is formed by two parts, namely by a wheel body connected to the suction blower, and by a wheel blade covering the wheel body from the seed, and abutting the wheel body. One of the parts is stationary and forms a guide slot extending along the output path. The other rotatable part has follower slots that are distributed across the circumference thereof and that extend across the radial extension area of the guide slot.

A further device for separating seeds is described in DE 34 00 121. The device has a cell wheel rotatable in a housing and equipped with funnel-shaped bores for receiving the seeds. It is guided by an air stream exiting from a nozzle. The cell wheel is equipped with a ring its outer edge that ends approximately flush with the cell wheel and half of which projects into the funnels of the cell wheel. The ring has bores in the funnels with diameters that are smaller than the smallest seed.

A seeder having cell wheels for single-seed deposition is known from DE 410 440. The cells of the cell wheel are connected to each other by ejection grooves such that the seeds are dropped into the furrows at equal spacings from one or more cell rows by the ejector. Wavy separating walls are arranged between the cell rows to ensure a permanent movement of the seeds.

Further dosing and separating devices for seeders are known, for example, from U.S. Pat. No. 3,888,387, from U.S. Pat. No. 6,176,393, and from U.S. Pat. No. 6,634,522.

OBJECTS OF THE INVENTION

It is therefore an object of the present invention to provide an improved seed meter.

Another object is the provision of such an improved seed meter that overcomes the above-given disadvantages, in particular that ensures a uniform, precise, and error-free seed separation and dispensing at a high seed output and at higher travel speeds.

A further object is to provide a seeder that can work with seeds having uniform shapes, such as corn or sunflower seeds, and achieve an accurate separation at a high frequency, at the chronologically desired spacings (adjusted to the driving speed in case of field work), at a dispensing quality that is as accurate as possible, chronologically and locally.

SUMMARY OF THE INVENTION

A seed meter has according to the invention a housing forming a seed-holding supply chamber and an outlet chamber and a thin feed wheel rotatable in the housing about an axis and formed centered on the axis with an annular array of radially outwardly open and axially throughgoing seats each dimensioned to hold a respective seed. Structure in the housing is positioned to prevent seeds from moving radially outward from the respective seats in the supply chamber but not in the outlet chamber. A pressure differential is applied across the wheel to move seeds in the supply chamber into the seats so that the seeds are expelled from the seats in the outlet chamber. The seeds are fed one at a time into a seed conduit and/or to a conveyor for transfer to the seed conduit or to the down pipes of the seed coulters.

The feed element has a plurality of seats through which air flows and formed by the rotating feed wheel. To this end the seats are angularly equispaced in a circular array centered on the feed-wheel axis on one side of the feed wheel. The seats are closed when in the receiving, separating, and conveyor area, which is necessary for efficient entrapment and conveying of the seed. The seed dispensing into the seed lines preferably occurs approximately tangentially relative to the rotation axis of the feed element or wheel. In order to achieve this effect the seats in the output chamber open radially outward. It is also advantageous if the seats have such an opening or cross-sectional size relative to the seeds to be separated and/or to be dosed, that allows the partial engagement of the seeds to be dosed into the seats. An outer guide edge or shoulder of the guide disk is associated with the feed element or wheel so that the feed wheel projects radially outward past this guide edge. Furthermore, the feed element or wheel is oriented in front of the outer guide edge on a side facing the seed such that the seats are defined for receiving and retaining the seed by the feed wheel and the outer guide edge. Furthermore, one embodiment of the seed meter according to the invention may have in the output chamber a seed scraper that defines an approximately linear seed-travel path in the output chamber. The seats extend radially in the output chamber such that the seed dispensing is ensured in the desired direction.

Optionally, the edge leading the respective seed in the area of the outer circumference of the feed wheel may be rounded, cut, or beveled, which prevents the seed from being influenced by the guide edge angularly in an undesired manner when exiting the feed wheel.

The output chamber of the feed wheel preferably opens downward and forms a scraping element for the seeds to be separated from the rotating feed wheel. To this end the seeds can be dispensed downward while avoiding a collision with the is wall sections.

Another embodiment of the seed meter according to the invention provides that the pressure differential at the seats of the rotating feed wheel is cut off in the output chamber. The feed slots of the feed wheel extend radially in a star shape, and may additionally be curved rearward in the rotation direction of the feed wheel.

The seats for the seed transport are partially limited in the supply chamber by the feed wheel on three sides, and by the guide disk or separating element on one axial side. They then transition into an area in which the seats are delimited by the feed wheel on two sides, and by the guide disk on one to two sides.

Optionally, the seed meter may have a depth limiter underneath the seats formed at least partially by the feed wheel and by the guide edge that extends parallel to and at a spacing from the seats for defining the engagement depth of the respective seeds. The depth limiter may contribute to the fact that different seed shapes and/or sizes are conveyed equally well. On the other hand, this prevents smaller seeds from slipping through the seats in the direction of the air suction area. To this end a depth limiter extends at least generally parallel to the array of seats at a spacing from the feed element for defining the engagement depth of the respective seeds. In this variation the feed element or wheel is arranged between two is functional elements in a rotating manner, which are formed by the depth limiter and an inner guide edge.

Optionally, the opening cross-section of the seats may vary during the revolution of the feed wheel. Furthermore, the pressure differential at the seats of the rotating feed wheel may be cut off in the output chamber so that the pressure differential barrier at the seats is provided upstream of the seed output chamber.

In this manner the seats through which air flows are limited, or defined by at least two functional elements. The at least two functional elements may be arranged in an overlapping manner such that an approximately linear seed movement can be predetermined in the output chamber. It may further be provided that at least one of the limiting functional elements functions as a seed scraper in the output chamber. To this end the feed element or wheel is arranged between the two functional elements in a rotating manner. In this manner the feed wheel may be arranged between the partial depth limiter and an outer or inner guide edge, wherein the feed wheel projects past the outer guide edge at the outer periphery thereof. In this case the seeds are positioned in the respective seats, partially engaged in them, and are additionally guided with regard to their position by the stationary outer guide edge and the partial depth limiter at a spacing from the guide disk and parallel to it and are held in position until it has reached the output chamber.

Another embodiment may provide that the seats through is which air flows and arranged in the feed wheel are limited or defined by at least three functional elements, namely the depth limiter, at least one guide edge, and the feed element. Furthermore, the feed element is movable between the partial depth limiter and at least one of the guide edges during dispensing.

In general, as mentioned above, the feed element may optionally be a wheel (planar or arcuate), or a drum, which may rotate about the depth limiter for the seed such that the seed is conveyed angularly toward the output chamber and deposited there where it be moved in a straight line.

The cross-sectional size of the seats of the rotating guide disk varies according to the invention, and opens at least in the output chamber. Preferably, the seats of the rotating feed wheel open radially in the output chamber. In this manner a quick and safe, as well as solid holding of the seeds may be ensured, which may be facilitated by a high air stream. In order to be able to work with pressures that are as low as possible, or so that a pressure loss that is as low as possible is created by flow resistance, it is reasonable to work with cross-sections that are relatively large.

As mentioned before, the seats of the seed meter according to the invention that are closed at the wheel's outer periphery are formed by at least one stationary guide disk and by the rotating feed wheel. To this end the feed wheel is parallel and at a slight spacing from the guide disk. The wheel may optionally glide on the disk at their axially directed and confronting side faces. In order to open the feed seats in the output chamber, the guide disk has a ring segment-shaped groove comprising guide edges extending through the receiving, separating, and conveyor area in a conveyor path of the seed conveyed and separated by the rotating feed wheel. Preferably, the ring segment-shaped edges of the guide disk end in a straight or slightly arcuate shape tangentially, which defines the output chamber. The inner guide edge thus simultaneously functions as a scraper for the seed, at least in the output chamber, since the travel from the conveyor area of the bend ends in a straight line to ensure that the seeds previously moved on a circular path are forced into straight-line movement when they are dispensed at the end of the output chamber. To this end the seeds are scraped off by the straight inner guide edge of the feed element.

The feed wheel is arranged preferably parallel and at a slight spacing from the guide disk. To this end a seal is provided between the guide disk and feed wheel, in a largely contactless manner.

According to a further embodiment of the invention the output chamber of the guide disk extends approximately vertically downward. The output chamber, and particularly the inner guide edge, forms a scraping element for the seed to be separated from the rotating feed wheel. When dispensing seed the closed seats are opened in that the feed wheel moves away from underneath the guide disk such that the inner edge of the guide disk scrapes the seeds out of the respective seats. Due to the radial opening of the seats through which air flow the seeds do not have to move axially with regard to the feed wheel during dispensing of the seed. A rotating feed drum according to the same principle may also be provided, from the outer periphery of which the seed is deflected in a straight movement and then scraped off.

Optionally, the guide disk may also be formed differently or may be made as a scraping element in any desired shape. Typically, the guide edge is configured such that the guide formed in this manner for the seed held and conveyed by the feed wheel expand radially at the outer radius in the dispensing or output chamber. Furthermore, the guide disk may be made such that the seed moves in a straight line up to the seed dispensing by the configuration of the guide disk in interaction with the feed wheel before the seed is dispensed. Also, the low pressure at the seats of the rotating feed wheel is cut off in the output chamber such that the seed can be drop downward. The output chamber extending in a linear manner may have a reasonable length of, for example, approximately 10 mm starting at the vacuum or over-pressure barrier, this length varying depending on the separated seed and may also be higher or lower depending on other conditions.

The feed wheel may be made particularly as a circular rotating wheel having guide slots open radially outward and that form the feed seats with the guide disk. Preferably, the guide slots extend toward the outside in the shape of a star, and optionally have a course that is arcuate as opposed to the rotational direction of the guide disk. Due to the shape of the guide slots in the guide disk the seeds move uniformly with a largely constant speed in the straight-line movement area at a uniform rotation of the guide disk, and may therefore be uniformly dispensed and scraped in an improved manner. The uniform dispensing of the seed from the feed wheel is improved in that the feed wheel projects past the structure or shoulder of the guide disk, and thus past an outer conveyor path.

Furthermore, accurate dispensing of the seeds is improved in that each seat that transports the seeds opens into the free space, e.g. the sides forming the seat hole simply end, and the seed is release on the current movement plane. In this manner uniform movement is possible during the dispensing of the seed, and the seed does not need to perform a short perpendicular movement toward the main dispensing direction, which would be necessary, if it were to be dispensed form a bore, or the like, tangentially from a feed wheel. The seeds are also dispensed in a path is a straight line during the final outputting of the seed, in such a manner that the seed is guided for a certain period of time, and not only by the sudden ceasing of the centrifugal force. This is achieved by the interaction of at least three parts and a slight flow of air. First is the depth limiter, on which the seed glides. Second is a stationary straight scraping element that maintains the seed movement on a straight path, and which forms one side of the seat. Third is a seat element having at least one side that pushes the seed forward. Air flow keeps the seed against the depth limiter, optionally also against the scraping element, which is straight at its end (if no parallel counter-guide to the stationary scraping element exists) until the air flow is so weak that the seed carries out the delayed movement coupled with the gravity thereof.

In order to make the straight-line movement slightly longer on exiting the wheel (in order to also provide some space for the reduction of the air flow), and in order to quickly open the closed seat quickly for exact dispensing, the feed wheel may have a greater outer radius than the outer guide edge of the feed seat so that the wheel has slightly more elongated feed slots. In order to achieve a straight and more uniform opening movement on exiting the wheel, the elongated feed slots must have be arcuate and concave backward relative to the rotation direction of the wheel. It is also advantageous, if the arcuate feed slots become slightly broader toward the outside, which prevents a possible jamming of the seed. In order to achieve a good accommodation in case of the removal of the wheel, three sides of the seat (in a simplified four-sided view) of the wheel are formed at the supply chamber. Two sides, or one side of the seat of the rotating wheel are formed in the output chamber. During the guide transition of the inner radius side of the seat a stationary scraping element that is straight at the end virtually merges to a seat inner radius circle, the seat outer circle radius also widening in order to prevent jamming of the seed.

According to a further embodiment of the invention the feed wheel rotates parallel to and at a spacing from a depth limiter for defining the engagement depth of the respective seed in the seats. Optionally, the feed wheel may also rotate only in sections, or partially parallel to the depth limiter. Furthermore, an embodiment is also conceivable, whereby the feed wheel extends slightly transverse to the depth limiter such that it may effect a variable engagement depth. Analogously, it applies to a radial approach in case of a feed drum that rotates concentrically to an annular depth limiter at a smaller radius than the drum.

The largest possible flow cross-section for a seed engagement is achieved in that the seed is inserted into a recess approximately half way, and a pressure differential or air flow is provided all around.

In this manner a sliding segment may be provided axially spaced from the seats of the feed wheel and having the shape of a circular ring segment parallel to the edge in the shape of a ring segment of the guide disk. To this end the depth limiter is underneath part of the array of seats. Optionally, the depth limiter may be made only in a certain area of the conveyor path. In order to achieve this, and to avoid a throughput of the seeds in the air flow, a depth limiter for the seed may be provided at the seats. In order to again hinder the air flow as little as possible, the depth limiter underneath the seats must transition into a greater volume as quickly as possible in order to maintain the air flow resistance as low as possible, which is achieved by moving the depth limiter away from the level of the seats. An even greater air flow is achieved, if this is realized on both sides, or on multiple sides.

The depth limiter must extend underneath a circular arc in case of larger seed, optionally also only in the output chamber, and may be kept narrow at varying dimensions depending on the seed to be separated. The depth limiter may also be narrower than the adjacent seats and may also be wider or equally wide, depending on the requirements for separating the seed and the overall system.

A recess or flow channel is provided on one side of the depth limiter. Optionally, the recess or flow channel may also be provided on both sides of the depth limiter. Stop bars or the like must be provided in the output chamber to act as air flow barriers and cut off the low pressure in the output chamber such that the seeds may be scraped from the inner guide edge.

One illustrated embodiment may also use a worm conveyor. In this case two sides of a stationary guide slot are made at the upstream end and two worms form the rest. The depth limiter must also be provided in this case, such as by an increased worm shaft axis.

Optionally, an additional seed scraper may be provided in the conveyor area for separating and uniformly dispensing the seed in a conveyor area. Generally, all types of forms are possible for the scraper, such as mechanical seed scrapers, pneumatic seed scrapers, or pneumatic-mechanical seed scrapers.

The seed-collection or supply chamber may, for example, also have an air supply for swirling and/or assisting the seating of seed in the feed wheel within the seed collection chamber. The air-supported swirling or agitation may be carried out particularly by one or more air supplies. The air-supported swirling may also be carried out by the air flow of the separating process. In this embodiment the seed collection chamber forms a swirling chamber that is constantly impinged by supplied air in order to constantly stir the seeds and prevent blocking or blockages such that all the seats of the feed element are each supplies with a respective seed. Another embodiment of the invention provides a deflecting vane in the seed collection chamber against which a stream of pressurized air is directed. An air-flow guide of the separating air flow is carried out at the deflecting vane.

The seat holes can be made using thin material in order to provide sufficient space for the necessary air flow around the seats, and which will not limit a scraping of too many seeds too greatly, and in order to achieve a wheel return cross-section that is as low as possible in the area of the directed air flow in case of a removal of the wheel.

The flow channel resulting from the offset depth limiter may have air flow barriers toward the seed output chamber such that the flow is greater at the seat edge when seed is received, than when the seed is dispensed, preferably before it exits the free space.

Preferably the sealing between the guide and feed wheel is carried out in a contact-less or gap-sealing manner. The air flow outlet is located on the sliding segment side in the area where the seed is received, or in the area of the seed scraper.

Another embodiment of the seed meter provides, for example, that a swirling chamber having a pressure connection for supplying air is provided for swirling and/or assisting the seed collection via the feed wheel inside the seed collection chamber and/or the swirling chamber. Furthermore, a deflecting vane against which an air stream is directed may also be provided in the swirling chamber for guiding the air flow in the swirling chamber. A narrow passage may further be provided between the swirling chamber above the deflecting vane and the output chamber, which supplies a constant low pressure in the area of the swirling chamber, and ensures that seeds flying about in the swirling chamber do not exit it. A cross-sectional expansion is made after a narrow passage in the area of the dispensing chamber. At the narrower passes the air flow is directed back toward the seed feed direction with the wheel. In this manner a very small installation size is possible. Simultaneously the passage ensures that the amount of air necessary for the function of separation is reduced. The narrow passes may be reduced, particularly in axial direction with regard to an axial height of the swirling chamber. The deflecting vane serves for distributing the air flow from the supply air connection and for continuous circulation of the seed in the swirling chamber. The deflecting vane may preferably be made such that the air flow is distributed, approximately divided in half, at the deflecting vane in this manner. Furthermore, an agitator element may be connected to the feed element, which ensures that the seed is kept in motion in the area of the seed collet.

In order to avoid the suctioning in of dirt, an external supply air connection may further be present, which carries out an air exchange in the separator such that no unnecessary low pressure is built at that location.

The storage chamber may be filled, for example, via a larger container connected upstream. The storage chamber also may be filled by a pneumatic feed system. Furthermore, air scraping of the seed may be provided in order to remove any excess seed moved during the receiving of the seed from the seat so that only one seed remains at a seat. Air flow serves for assisting seed collection at the location where the seats receive the seeds. To this end practically any form of seed scraper is possible, such as mechanical seed scrapers, pneumatic seed scrapers, or pneumatic-mechanical seed scrapers.

Another embodiment of the seed meter provides that the seat for the seed transport in the receiving area is delimited on three sides by the feed wheel, and on one axial side toward the outside via the guide disk, and then transitions into an area in which the seat is delimited at two sides by the feed wheel and at one to two sides by the guide disk.

It is advantageous that the seed does not have to move axially with regard to the feed wheel via the radial opening of the seats being impinged with air flow. The diameter of the feed wheel is larger than the diameter of the guide disk outer edge. Furthermore, the seat cross-section of the seats may vary during rotation of the feed wheel. An additional vacuum barrier may be connected upstream of the seed output chamber.

The single seed dispensing from the housing may end directly in a seed slot or in a down pipe. However, the single seed dispensing from the housing may also end directly into a conveyor air flow.

The drive of the dosing device may be made in any desired manner, such as by a chain, belt, or universal drive, or may also be directly driven via pneumatic, hydraulic, or electric drives.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
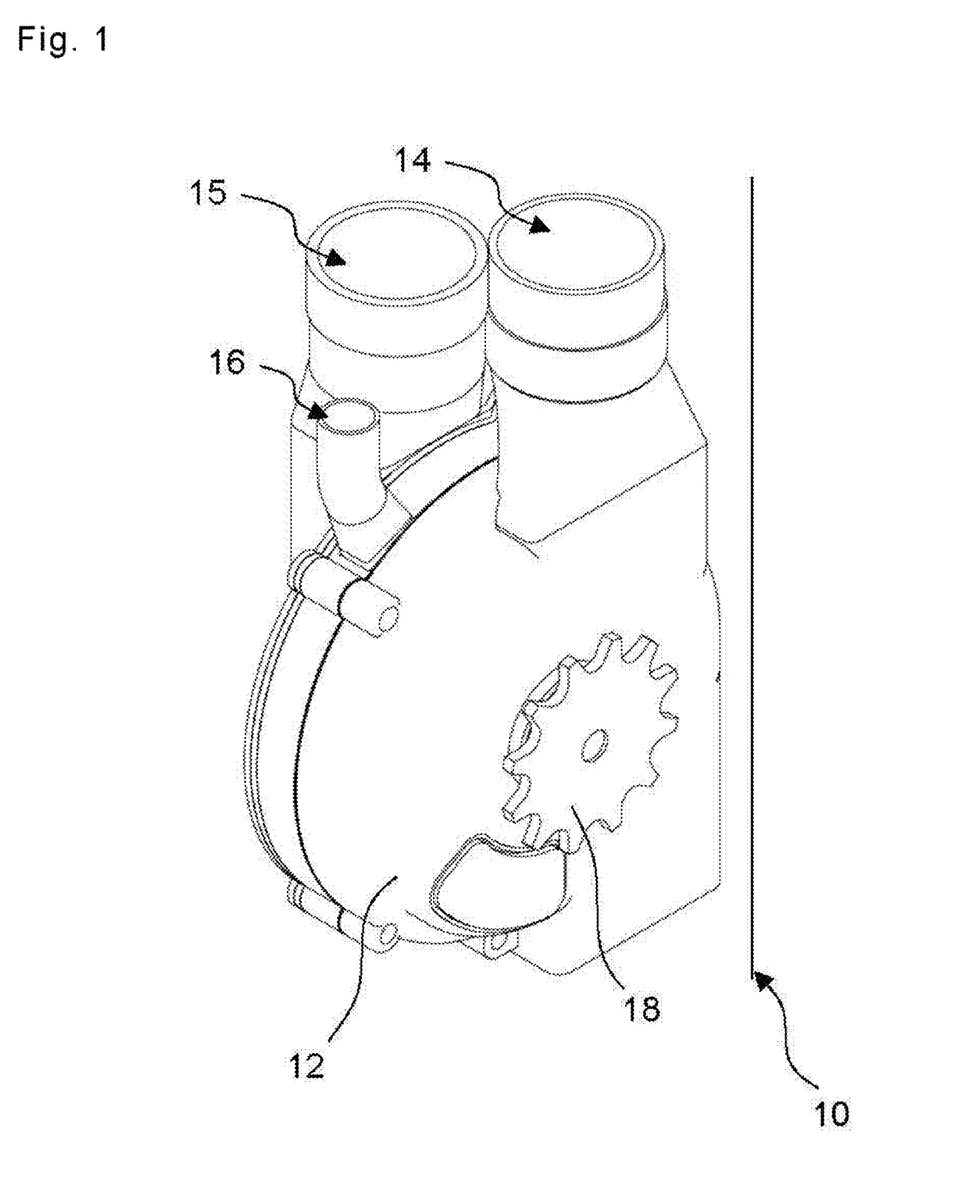
FIGS. 1 and 2 are back and front perspective views of the seed meter according to the invention.
Figure 2:
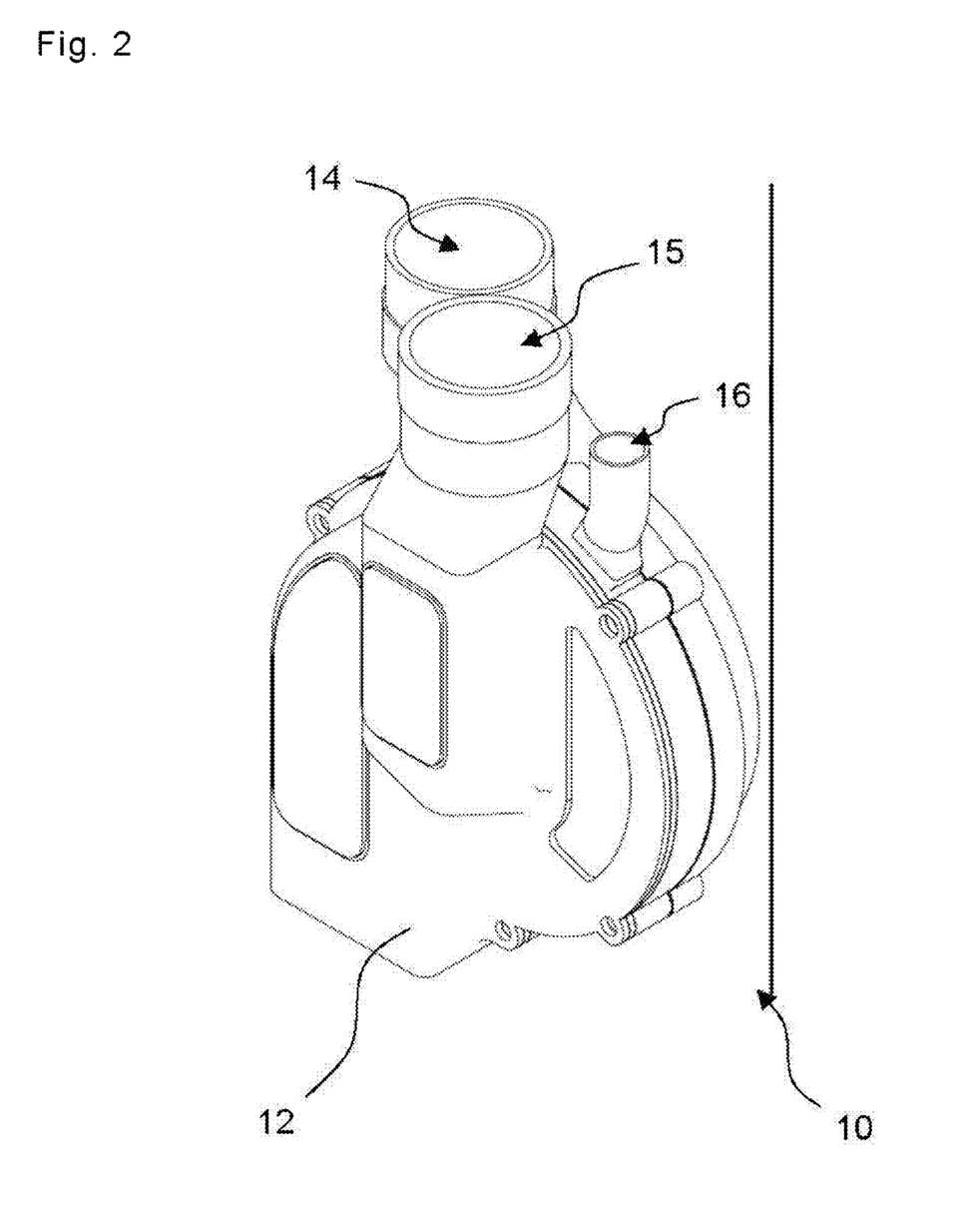

FIGS. 1 and 2 show a seed meter 10 particularly intended for use with seeds, such as corn kernels or sunflower seeds, and having a drum-shaped three-part housing 12 having a large fitting 14 on its back top side for connection to a low-pressure line, another large fitting 15 on its front top side for charging seeds into the housing 12, and a smaller fitting 16 for connection to a high-pressure line. A sprocket 18 on a flat back side of the housing 12 (see FIG. 1) rotates a feed disk or wheel 22 inside the housing 12 and further described in detail below. The sprocket 18 is driven by an unillustrated chain or the like.

Figure 3:
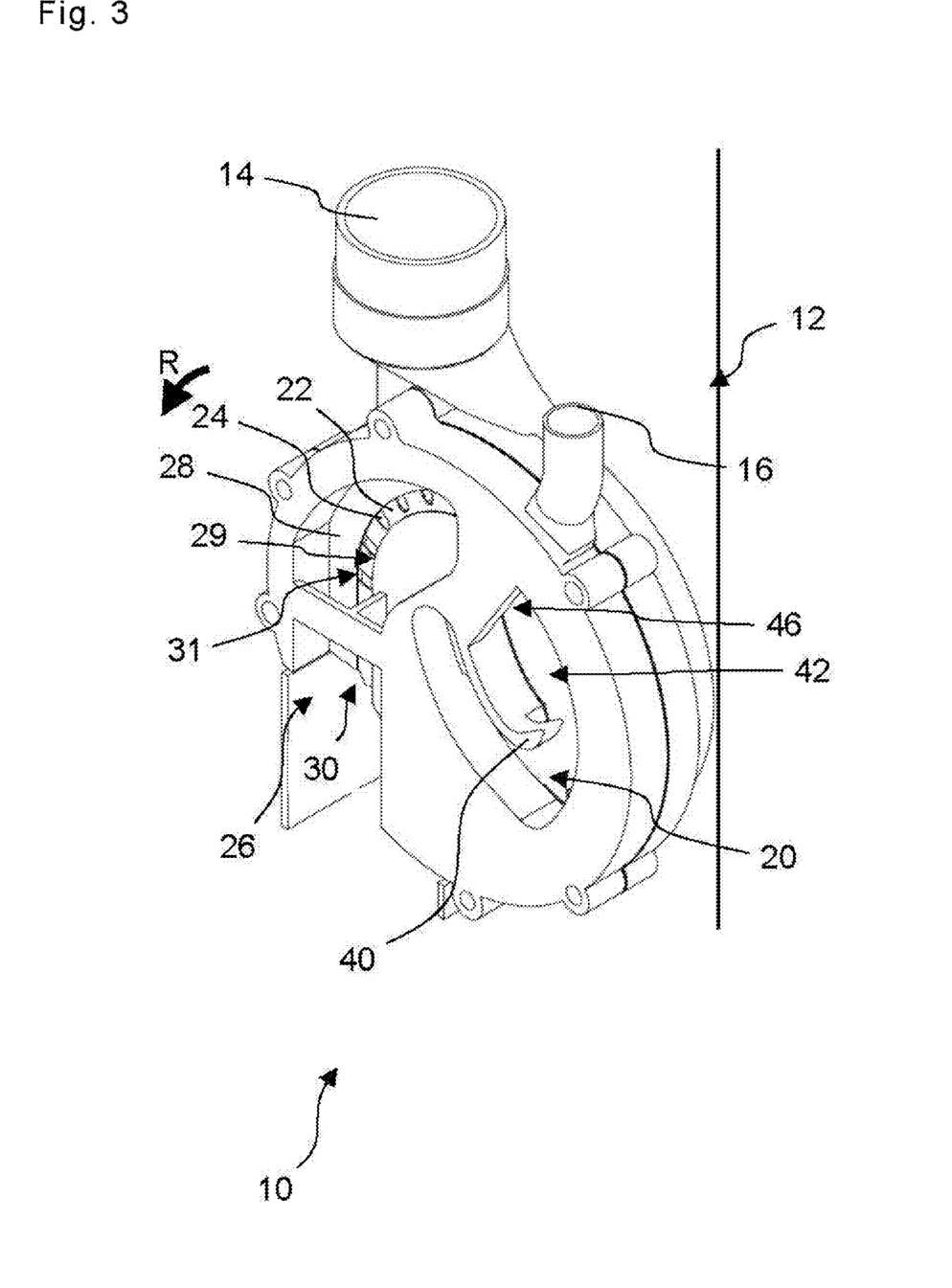
FIG. 3 is a front perspective view like FIG. 2 but with a front part of the meter housing removed.

FIG. 3 shows the housing 12 of the seed meter 10 with its front housing part carrying the seed input fitting 15 removed. The housing parts form a supply chamber 20 in which the wheel 22 is rotated by the air inputted at 16. The chamber 20 serves as an intermediate or seed-collection chamber for supplying seeds to be separated to the rotating feed wheel 22, and may be provided with an agitator shaft that is attached to the wheel's drive shaft. The feed wheel 22 has a circularly annular array of angularly equispaced seats 24 through which air is sucked to the fitting 14 for receiving, separating, and conveying seeds in a rotational direction R of the feed wheel 22 to an output chamber 26. The seats 24 are outwardly closed in a receiving, separating, and conveying area inside the housing 12 upstream of the output chamber 26. The seats 24 can be of different cross-sectional sizes and are open in the output chamber 26 such that the seeds may be dispensed from the feed wheel 22 at uniform spacings and may fall vertically downward out of the output 26.

Figure 4:
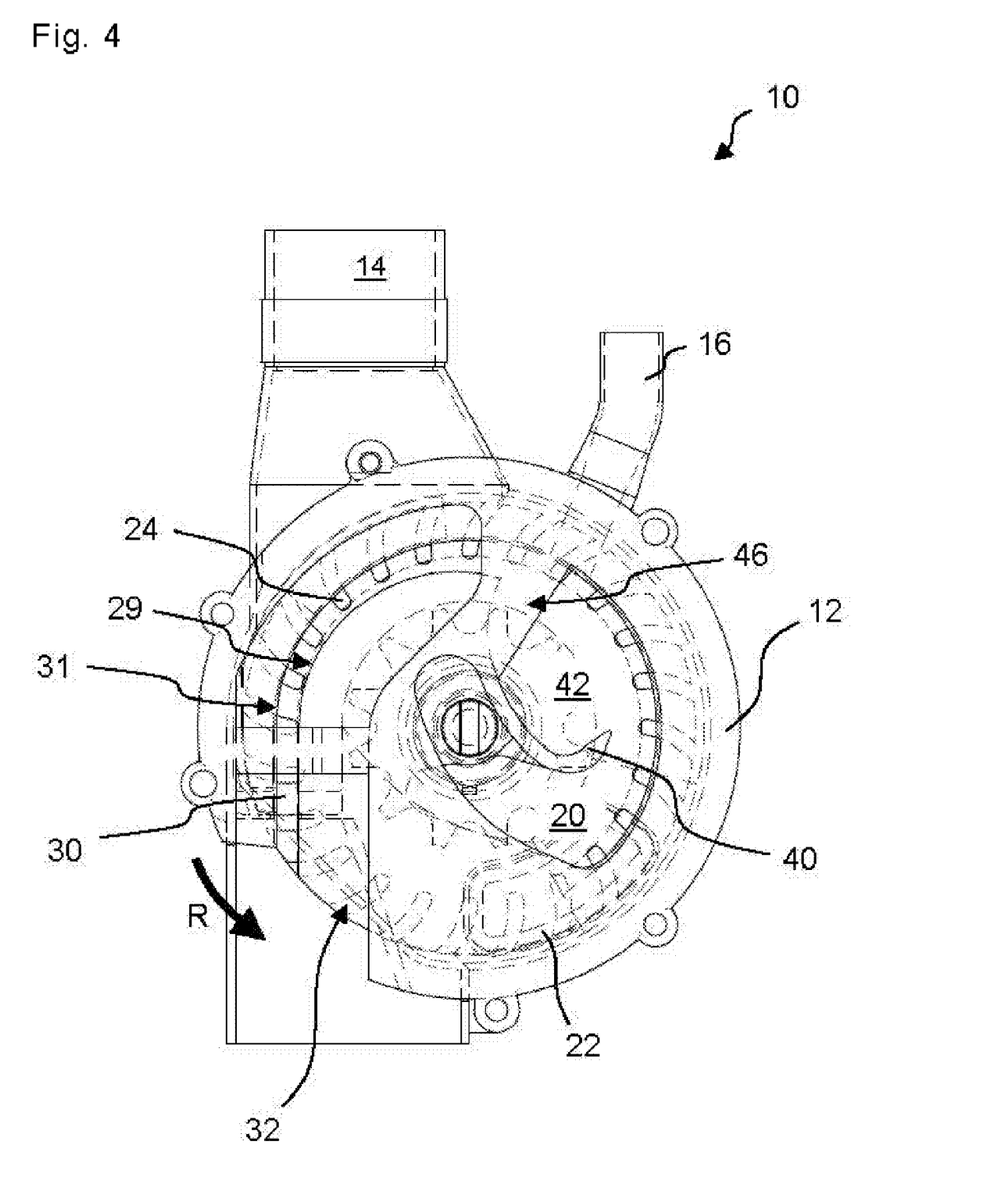
FIG. 4 is a front elevational view with the front part of the housing removed as in FIG. 3.

As can be seen in FIG. 4, the seats 24 are radially outwardly open only in the output chamber 26. To this end, the seats 24 are formed by a stationary guide disk 28 and the rotating feed wheel 22. The guide disk 28 is parallel to and at a slight spacing from the feed wheel, as shown in FIGS. 2 and 3. It has a radially inwardly directed shoulder or edge 31 with a circularly arcuate upstream part centered on the wheel axis and extending angularly through the receiving, separating, and conveying area and a straight, tangential, and downwardly extending straight part in the output chamber 26 where it forms with a radially outwardly directed shoulder 29 of the disk 28 a downwardly open groove 30 open axially rearward toward the wheel 22. The groove 30 in the output chamber 26 serves to strip seeds from the wheel 22 one at a time and eject them from the housing 12 through the output 26. The passage of air from the front to the back through the disk 22 serves to draw the seeds into the seats 24 and hold them there, but the flow of air is cut off in the output chamber 26 so that the seeds can there drop downward out of the seats 24. The edge or shoulder 29 thus has relative to the rotation direction an arcuate upstream part that converges radially with the upstream part of the outer shoulder 31 and a straight downstream part parallel to the straight downstream part of the shoulder 31.

As shown in FIG. 4, the feed wheel 22 is a circular rotatable disk formed with radially outwardly open and axially through slots 32 that form the feed seats 24 with the guide disk 28. The feed slots 32 are slightly arcuate and have, relative to the direction 4, radial inner ends that are forward of their radial outer ends. The feed wheel 22 projects radially outward past the outer shoulder 31 except in the chamber 26.

Figure 5:
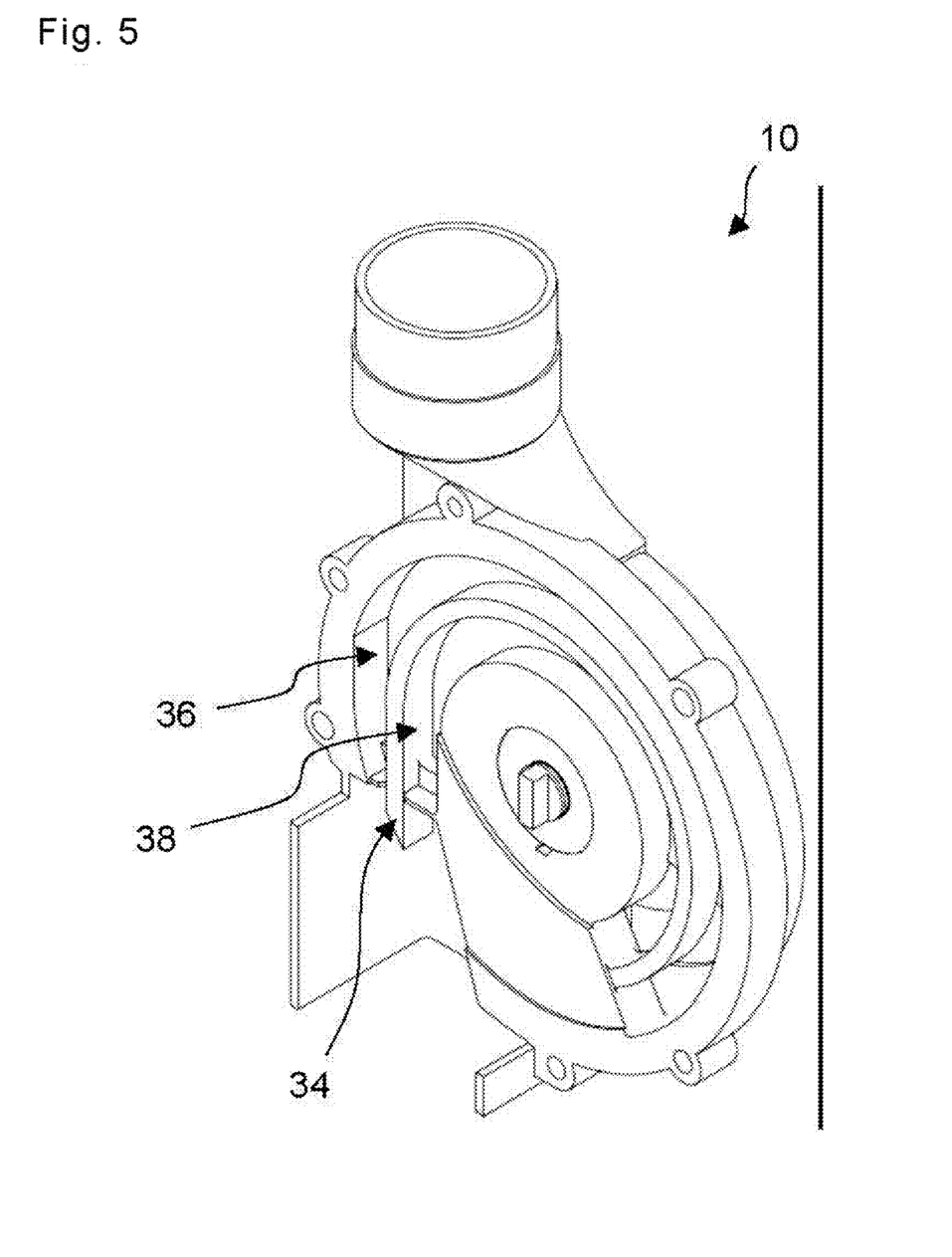
FIG. 5 is a front perspective view like FIG. 2 of only the rear part of the seeder housing.

As shown in FIG. 5, where both the feed wheel 22 and the guide disk 28 are removed, an axially forwardly projecting circularly segmental slide ridge 34 forms a depth limiter for the depth the seeds can engage in the seats 24 of the feed wheel 22. To this end an axial position of a front edge of the slide segment 34 extending parallel to the edge 31 and having approximately it width as the groove 30 defines the insertion depth of the seeds. Part-circular flow channels 36 and 38 are positioned radially inside and radially outside the slide segment 34 and are under subatmospheric pressure from the fitting 14. The flow channels 36 and 38 ensure that the pressure differential holds the seeds in the seats 24 all along the circularly arcuate upstream part of the guide edge 30, but not in the output chamber 26.

Figure 6:
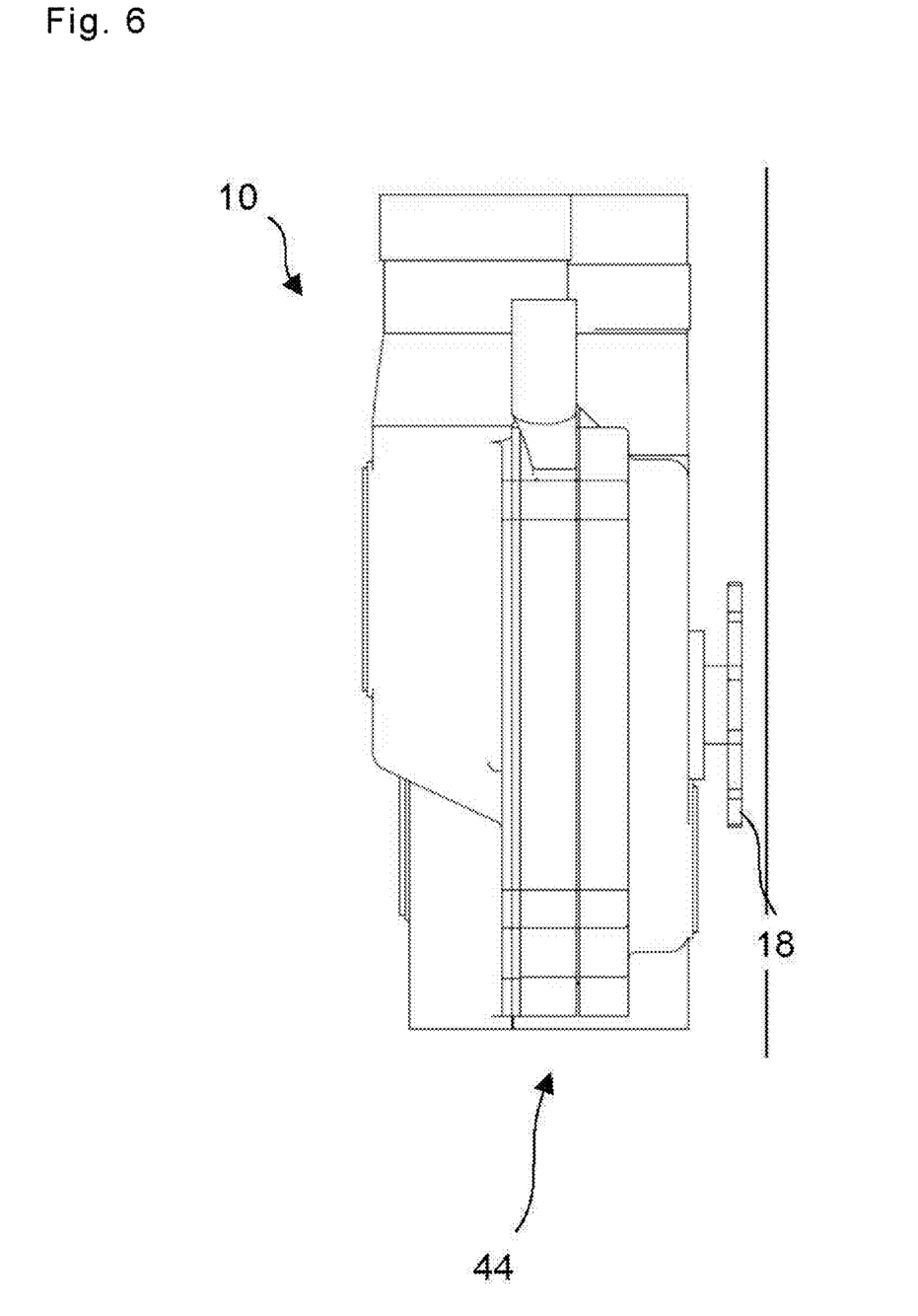
FIG. 6 is an edge view of the seed meter with the front on the left and the back on the right.

The seed-collection or storage chamber 20 together with the high-pressure connection 16 serves for agitating the seeds in the storage chamber and for holding the seeds in the seats 24 of the feed wheel 22 inside the seed collection chamber 20 (see FIG. 3). To this end a deflecting vane 40 at which the high-pressure fitting 16 directs a stream of air is provided inside the seed collection chamber 20. The deflecting vane 40 upwardly delimits the storage chamber 20 and forms the floor of a swirling chamber 42. A relatively narrow passage 46 is formed at the radial outer end of the arcuate vane 40 between the chambers 20 and 42. This narrow passage 46 is of small flow cross section such that air flow between the chambers 20 and 42 is limited. The end of the drive shaft carrying the wheel 22 may be equipped with an eccentric pin or the like that may serve as a agitator or stirrer such that the seed that it engages is kept in motion. FIG. 6 shows a seal 42 between the guide disk 28 and the feed wheel 22.

In the seed meter 10 shown each seed dispensed by the housing 12 may end directly into a seed furrow, or pass through a down pipe (not illustrated). Each seed coming from the housing 12 may also go directly into a conveyor air stream (also not illustrated).

Figure 7A:
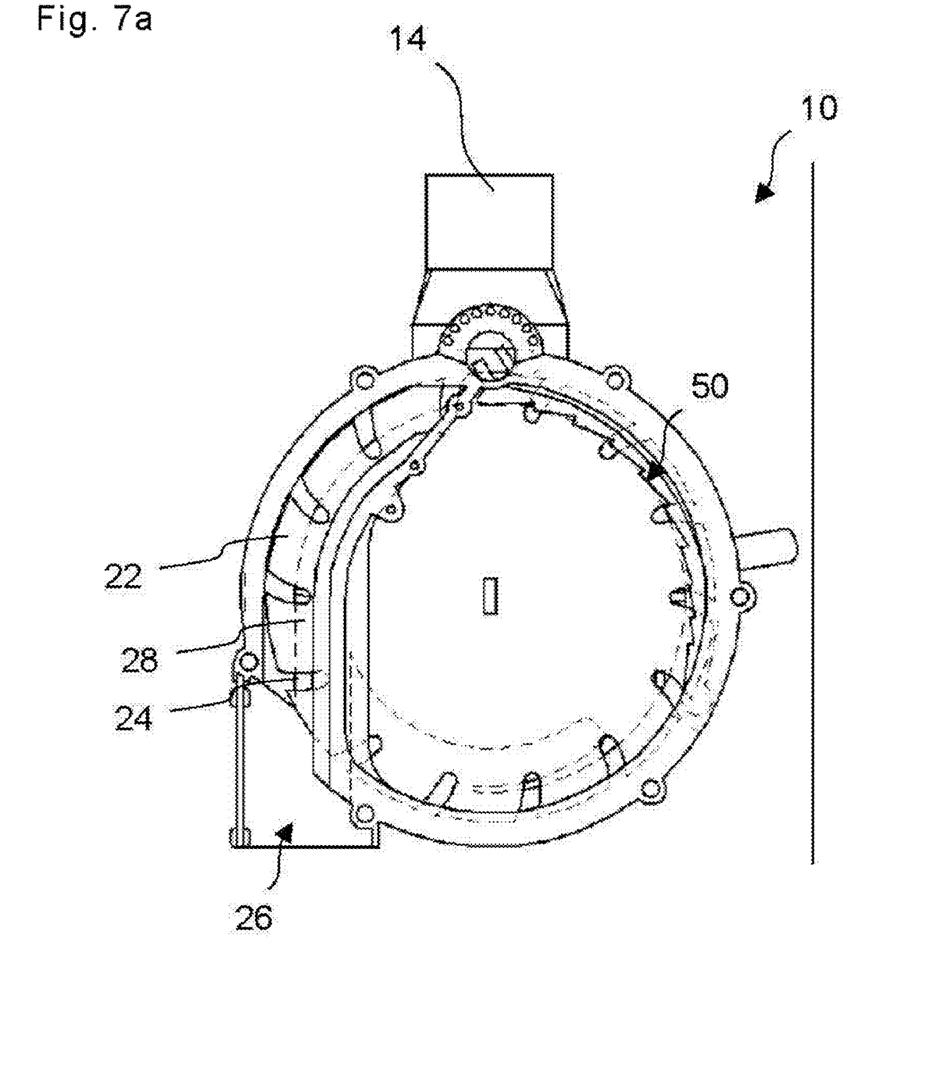
FIGS. 7*a* and 7*b* are views like respective FIGS. 4 and 5 of a second embodiment of the rear housing part.
Figure 7B:
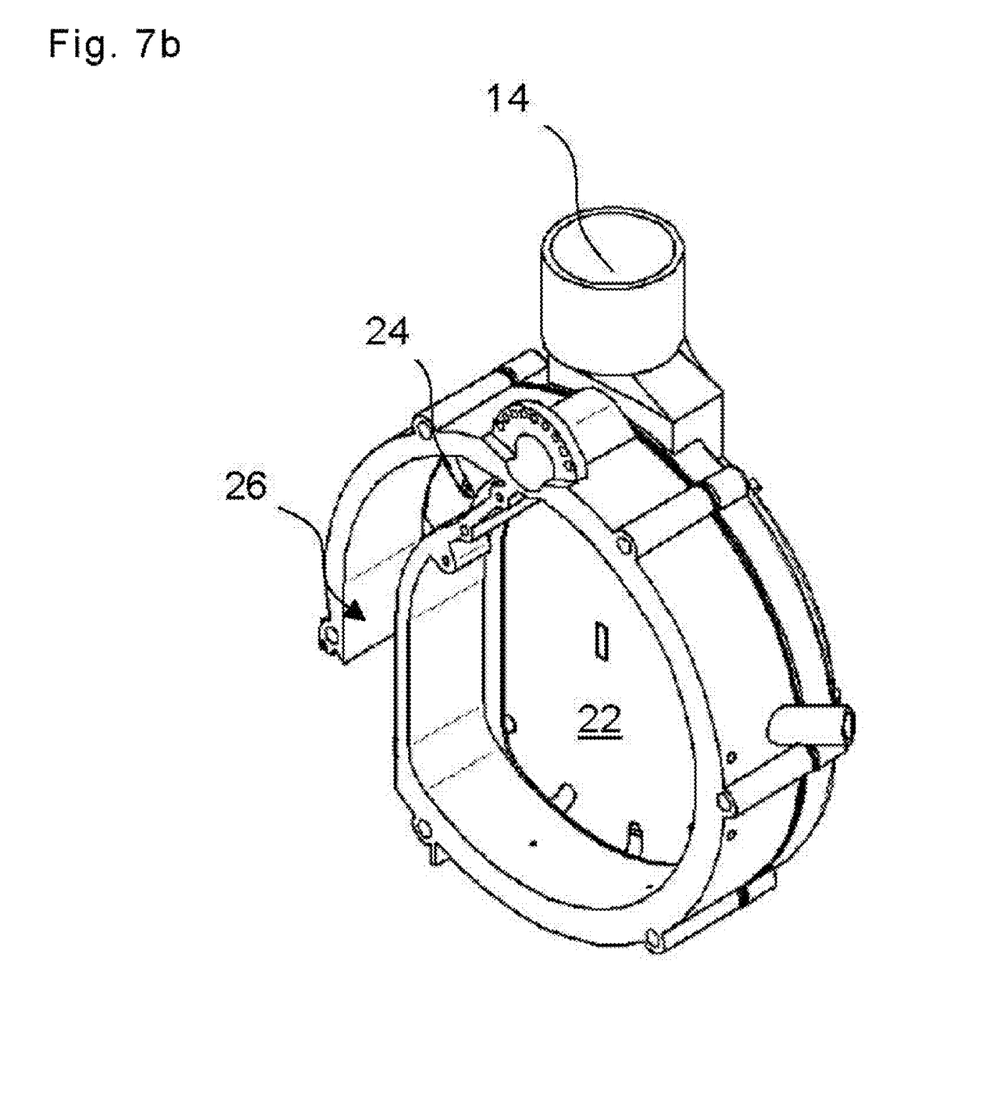

Both illustrations of FIG. 7a and FIG. 7b show in two views an embodiment of the seed meter whose feed wheel 22 is mounted axially in front of its guide disk 28. It is nearly covered by the feed wheel 22 in the front view of FIG. 7a, e.g. is located behind the feed wheel in the views of FIGS. 7a and 7b. A depth limiter in the supply chamber corresponding to the previously described embodiment is not necessary, since the engagement depth of the corn or sunflower seeds is approximately equally large and depends only on the dimensioning of the seats 24. FIG. 7a further shows a mechanical seed scraper 50, which is indicated by a jagged line between a 12 o'clock and a 4 o'clock position of the wheel 22.

Figure 8A:
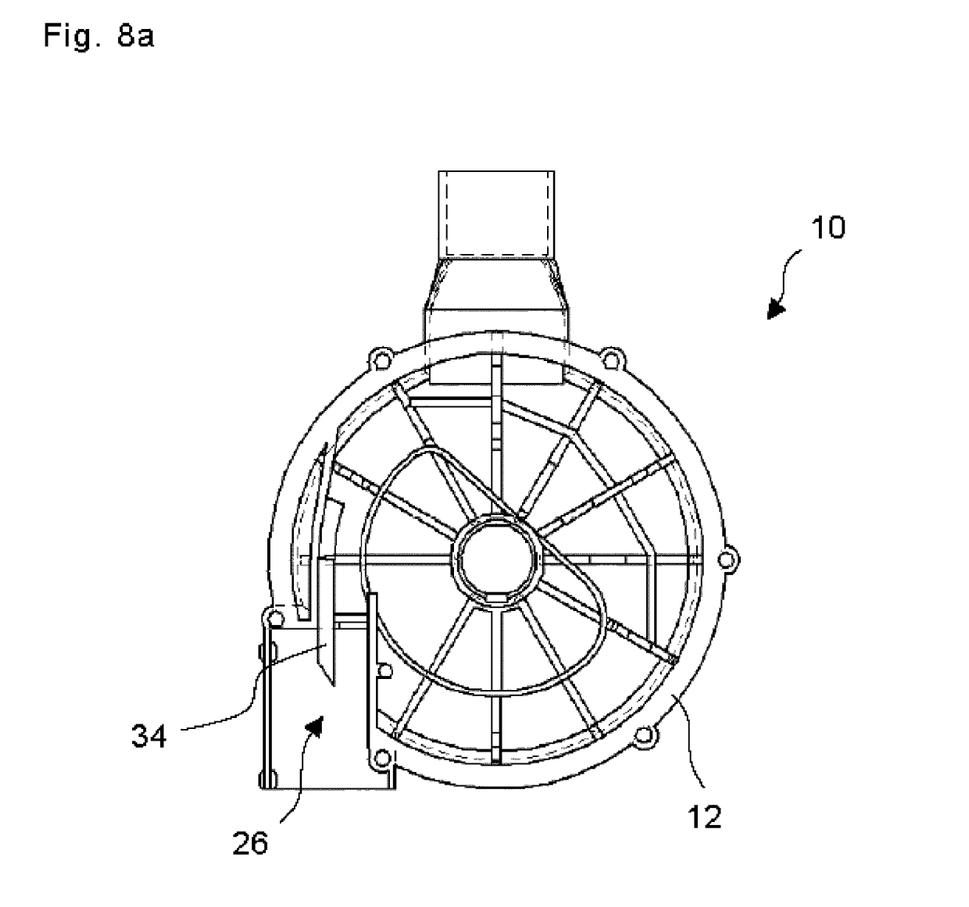
FIGS. 8*a* and 8*b* are two further views like respective FIGS. 4 and 5 of a third embodiment of the rear housing part.
Figure 8B:
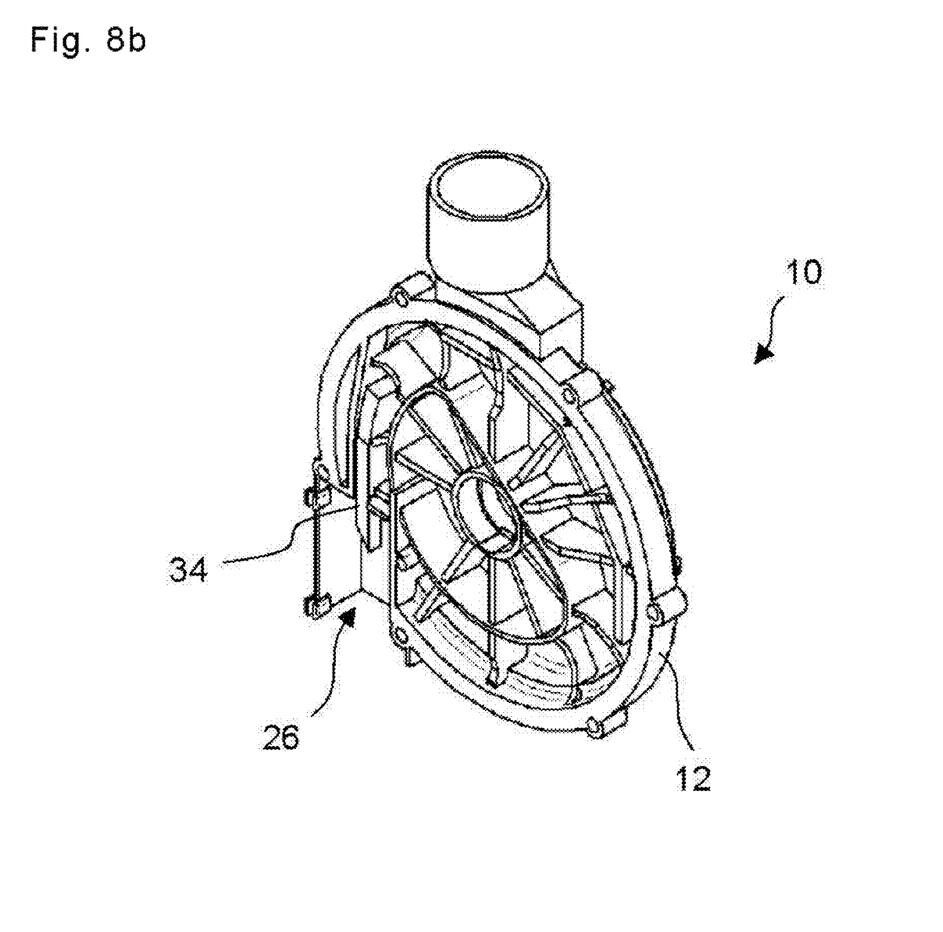

FIGS. 8a and 8b show in two further views a sliding segment 34 that is relatively short and mounted adjacent the output chamber 26 so as to form a depth limiter for the seed. In connection with the arrangement of the feed wheel 22 and the guide disk 28 according to FIG. 7 the length of the sliding segment 34 is sufficient to provide the seed the desired guidance in the output chamber 26.

Figure 9A:
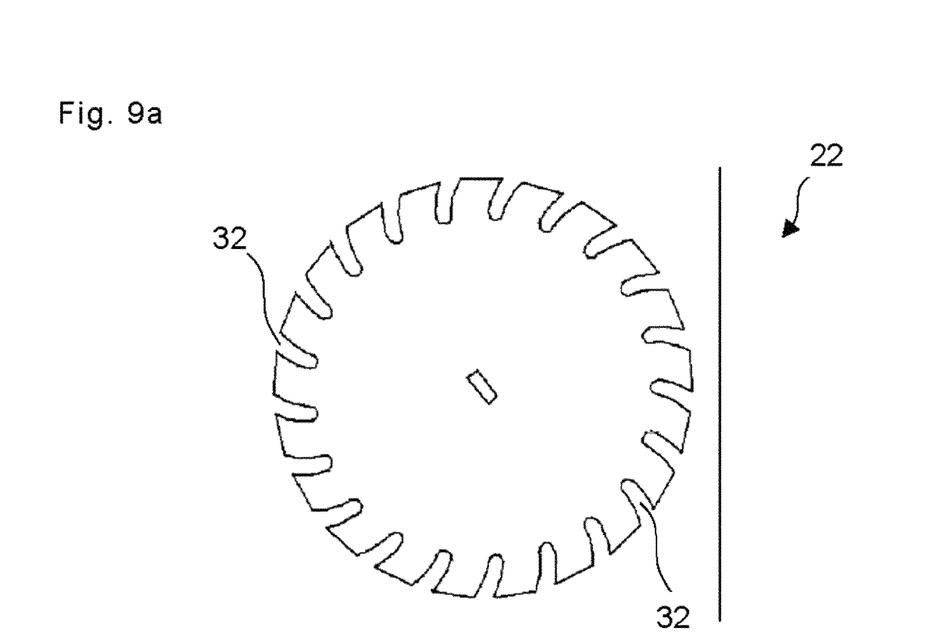
FIGS. 9*a* and 9*b* are side elevational views of different feed wheels according to the invention.
Figure 9B:
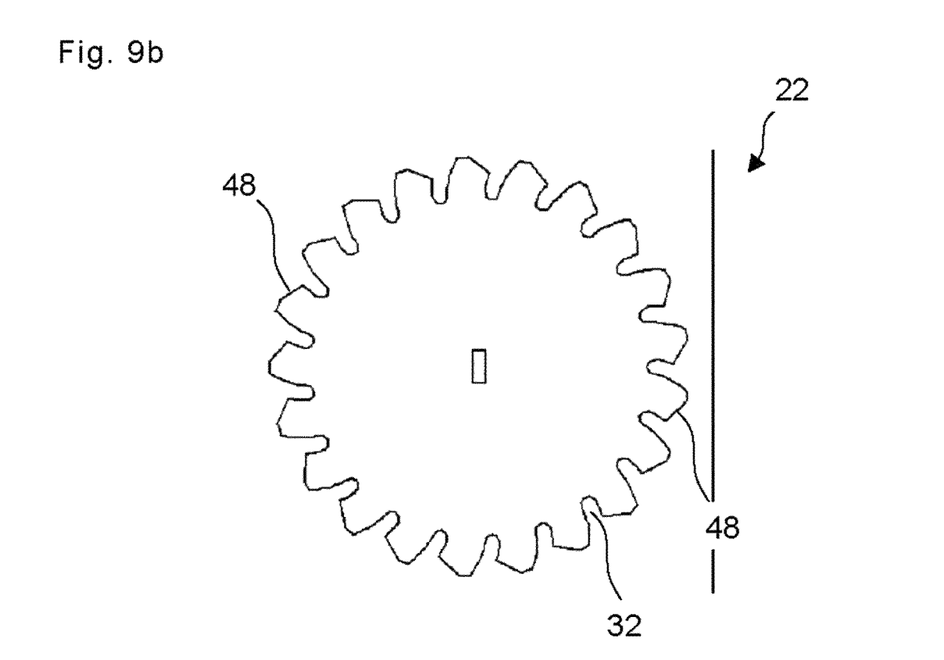

FIGS. 9a and 9b show two different embodiments of a feed wheel 22. While the feed wheel 22 according to FIG. 9a has the previously described shape comprising the continuous, largely consistently wide feed slots 32, in FIG. 9b trailing parts 48 of the outer edges of each tooth formed between adjacent slots 32 cut off or beveled to prevents seed from being influenced in the flight direction thereof by the leading edge on exiting the feed wheel 22 in an undesired manner. Preferably, the degree of bevel and the dimensioning is to be determined in tests.

The invention is not limited to the previous illustrated embodiments. Rather a plurality of variations and modifications is conceivable, which make use of the aspect according to the invention, and are therefore also covered under within the scope of the invention.

I claim:

1. A seed meter comprising:
  a housing forming a seed-holding supply chamber and an outlet chamber;
  a feed wheel rotatable in the housing about an axis, having an axially directed front face axially delimiting the supply and outlet chambers and an axially oppositely directed rear face, and formed centered on the axis with an annular array of radially outwardly open and axially throughgoing seats each dimensioned to hold a respective seed;

structure in the housing positioned to prevent seeds from moving radially outward from the respective seats in the supply chamber but not in the outlet chamber; and means for applying a pressure differential across the wheel with lower pressure on the rear face than on the front face in the supply chamber and air flow through the seats from the supply chamber, thereby moving seeds in the supply chamber into the seats, whereby the seeds are expelled from the seats in the outlet chamber.

2. The seed meter defined in claim 1, further comprising a guide disk axially juxtaposed with the feed wheel and fixed in the housing, the structure being a radially inwardly directed shoulder formed on the guide disk.

3. The seed meter defined in claim 2 wherein the shoulder is axially juxtaposed with the front face of the wheel and spaced radially inward of an outer periphery of the wheel.

4. The seed meter defined in claim 3, further comprising a formation fixed relative to the housing in the outlet chamber and positioned to push seeds therein out of the respective seats.

5. The seed meter defined in claim 4 wherein the structure and formation extend at a spacing, as straight lines, and parallel to each other in the outlet chamber to conduct the seeds in a straight line out of the housing.

6. The seed meter defined in claim 5 wherein the straight lines are vertical and form a downwardly open groove.

7. The seed meter defined in claim 4 wherein the feed wheel has an outer periphery formed with bevels between the seats.

8. The seed meter defined in claim 4 wherein the formation is beveled or rounded at an outlet end.

9. The seed meter defined in claim 2 wherein the housing is so constructed that no pressure differential is applied across the feed wheel in the outlet chamber.

10. The seed meter defined in claim 2 wherein each of the seats is a radially outwardly open notch having relative to a rotation direction of the wheel past a radial outer end leading a radial inner end.

11. The seed meter defined in claim 10 wherein each notch is arcuate and concave rearward in the rotation direction.

12. The seed meter defined in claim 2 wherein the seats are formed by notches in the feed wheel delimited angularly and radially inwardly by the feed wheel, the seats being delimited radially outwardly in the supply chamber by the structure, and axially in one direction by the guide disk.

13. The seed meter defined in claim 12 wherein the housing is formed with a depth delimiter delimiting the seats in the supply chamber in the opposite axial direction.

14. The seed meter defined in claim 2 wherein the means for applying pressure feeds air at superatmospheric pressure to the supply chamber to one axial side of the wheel and withdraws the air from an opposite axial side of the disk.

* * * * *